Aug. 31, 1948.                G. B. BAILEY                 2,448,206
                              GAS ANALYZER
Filed Dec. 29, 1943                                    2 Sheets-Sheet 1
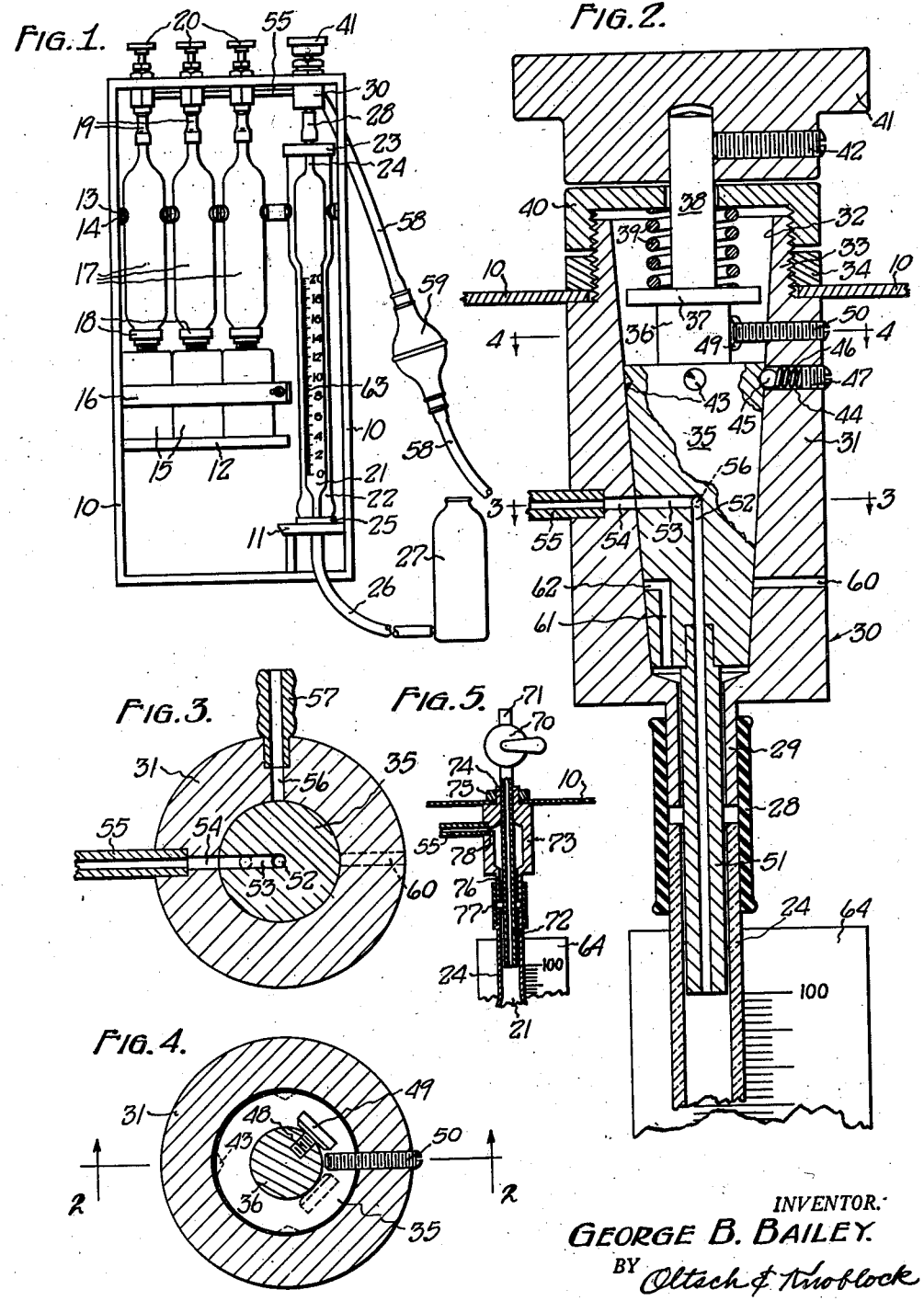
INVENTOR.
GEORGE B. BAILEY.
BY Oltsch & Knoblock
    Attorneys.

Aug. 31, 1948.　　　　G. B. BAILEY　　　　2,448,206
GAS ANALYZER
Filed Dec. 29, 1943　　　　2 Sheets-Sheet 2
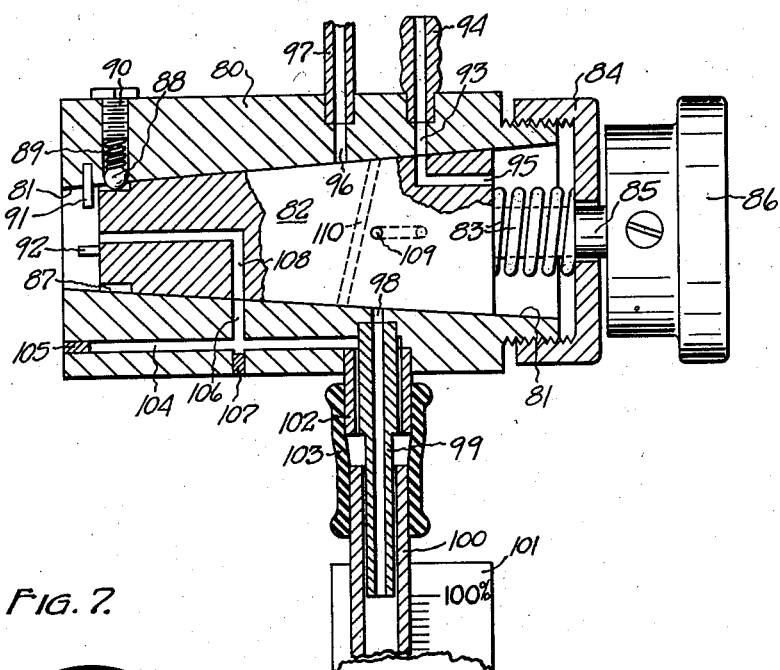
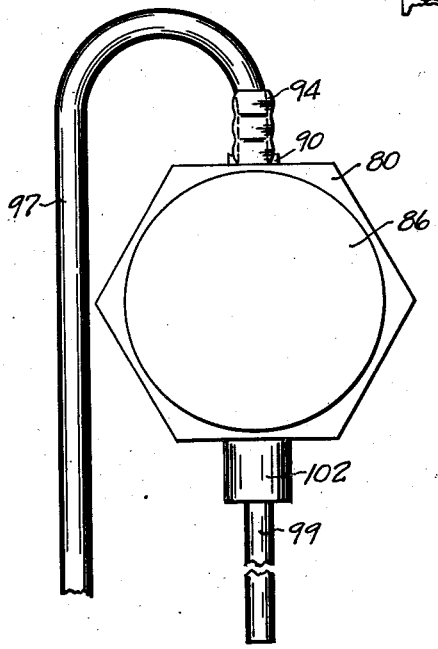
GEORGE B. BAILEY.
INVENTOR.

Patented Aug. 31, 1948

2,448,206

UNITED STATES PATENT OFFICE 2,448,206

GAS ANALYZER

George B. Bailey, Long Beach, Ind., assignor to The Hays Corporation, Michigan City, Ind., a corporation of Indiana Application December 29, 1943, Serial No. 516,011

12 Claims. (Cl. 23—254)

This invention relates to a gas analyzer, and particularly to a gas analyzer having a valve for controlling the sequence of operations in a gas analyzer of the Orsat type.

In conventional gas analyzers of the Orsat type, a gas sample is first introduced into the measuring chamber to fill the same and purge residual gases from the previous operation while a leveling bottle is positioned below the burette. The gas sample is then measured by elevating the leveling bottle to bring the liquid level in the burette to the zero point of the burette. Then the leveling bottle is elevated above the burette to force the gas from the burette into the absorbing chamber to permit the gaseous constituent which is to be measured to be absorbed. The residual gas is then drawn back into the burette by lowering the leveling bottle to the point at which the liquid therein is at the same level as the liquid in the burette, which point or level may be read on a scale juxtaposed to the burette and calibrated, as in terms of percentage of total gas sample originally measured. Then the residual gas is expelled.

Care must be exercised in the use of the device to prevent liquid from rising above the 100% point of the burette in exhausting spent gases from the device, since this may entail loss of liquid. Also, the constructions heretofore available have not been well adapted for reading to the 100% mark. Another difficulty experienced has been in connection with the proper sequential operation of the control valve in a complete measuring cycle, including the venting operation, between completion of one measurement or analysis and the start of the succeeding analysis.

It is the primary object of this invention to provide a gas analyzer with a control valve so constructed as to overcome each of the above mentioned difficulties and objections of conventional analyzers.

A further object is to provide a gas analyzer with a valve having a conduit portion projecting into the burette with a capillary fit therein and terminating at the 100% mark of the burette to bring gas into the analyzer at the 100% measuring point thereof and to prevent liquid from rising in the burette above said 100% point.

A further object is to provide a gas analyzer valve having self-locating means for each of multiple operative positions thereof and means for holding valve operation between predetermined operative limits whereby valve manipulation to successive operative positions is controlled in the sequence required to make a gas analysis.

Other objects will be apparent from the description, drawing and appended claims.

In the drawing:

Fig. 1 is a view in front elevation of a gas analyzer using my improved valve.

Fig. 2 is an enlarged longitudinal vertical sectional detail view, taken on line 2—2 of Fig. 4.

Fig. 3 is a transverse sectional view taken on line 3—3 of Fig. 2.

Fig. 4 is a transverse sectional view taken on line 4—4 of Fig. 2.

Fig. 5 is a longitudinal vertical sectional view, similar to Fig. 2 but on a reduced scale, of a modified embodiment of the invention.

Fig. 6 is a view, similar to Fig. 2, of another embodiment of the invention.

Fig. 7 is a front view of the Fig. 6 embodiment.

Referring to the drawing, and particularly to Figs. 1 to 4 thereof, the numeral 10 designates the frame of an analyzer having a horizontal platform 11 adjacent one side thereof, a second horizontal platform 12 projecting from the opposite side thereof, and a horizontal cross bar 13 above the level of said platforms and carrying a plurality of spring clips 14. A plurality of containers 15, containing different gas absorbing chemicals, are mounted upon platform 12 and are held in place by brackets 16. Each container 15 mounts a pipette 17 communicating therewith and held in place by a compression fitting 18 and by one of the spring clips 14. The pipettes are preferably filled with metal wool or other material capable of maintaining a wetted condition by capillarity when the lower portion thereof is immersed in liquid. Pipettes 17 have reduced dimension necks at their upper ends connected by rubber or like tubing 19 to a needle valve 20 carried by the top wall of housing 10 and positioned thereabove.

A glass burette 21 is suitably mounted on platform 11 and is enclosed within a glass water jacket 22 which is supported near its upper end by one of the spring clips 14. Water jacket 22 is sealed at its upper end by cap 23 fitting around the reduced stem or neck 24 of the upper end of the burette, and is also sealed at its lower end by a suitable fitting or gasket 25. The lower end of the burette 21 is of reduced diameter and projects through platform 11 for connection with one end of an elongated flexible conduit 26 whose opposite end is connected to the lower portion of a glass leveling bottle 27 which is open at its upper end. The upper reduced neck 24 of burette 21 above cap 23 is connected with a rubber or like tube 28 which is also connected with a neck 29 projecting from the control valve 30.

Control valve 30 is preferably of the construction illustrated in Figs. 2 to 4 and has a housing 31 from whose lower end the neck 29 depends. Valve housing 31 has a central downwardly tapering bore 32 communicating with the reduced diameter bore of neck 29. The upper portion of valve housing 31 has a reduced diameter externally screw threaded neck 33 which projects through an opening in the top wall of frame 10, and a nut 34 threaded on said neck serves to secure the valve in operative position on the frame. A frusto conical valve plug 35 has a snug rotatable fit in the bore 32. A reduced diameter neck 36 projects axially from the upper end of the valve plug and terminates in an enlarged flange portion 37. A shaft 38 projects axially above flange 37. A coil spring 39 encircles shaft and seats upon flange 37. A compression nut 40, threaded on the upper end of neck 33 confines spring 39 and regulates the pressure exerted by spring 39 to properly seat the valve plug in bore 32. Shaft 38 projects through compression nut 40 and mounts a knob 41 on its upper end, held in place by set screw 42.

The valve plug 35 has a plurality of recesses 43, here illustrated as four in number, formed in its periphery adjacent its upper end and lying in a common plane transverse thereof. A radial bore 44 is formed in the valve housing 31 in the same transverse plane as recesses 43. A ball 45 is mounted in the inner end of said bore and is pressed against the valve body 35 by a spring 46 confined in said bore by a set screw 47. A stop member 48 is screw threaded in the neck 36 of the valve plug and has an enlarged head 49 adapted to engage the inner end of a set screw 50 threaded in the valve housing 31 to limit the rotation of the valve plug 35 in the valve housing to less than 360°. The set screw 50 and stop head 49 are so proportioned and positioned with respect to recesses 43 in the valve plug that ball 45 may reseat successively in each of said recesses during rotation of the valve plug between its opposite limits of rotation as determined by said stop 49 and set screw 50.

The lower end of the plug valve mounts an elongated axial conduit 51 which extends downwardly therefrom through neck 29 and tube 28 and into the reduced diameter upper neck 24 of the burette 21. The valve plug has an axial bore 52 formed in the bottom portion thereof and communicating with conduit 51. A transverse or radial bore 53 is formed in the plug to communicate with the upper end of bore 52 and is connected with a header or conduit 55 preferably having a capillary bore and which extends to and is connected with the needle valves 20. Another radial bore 56 is formed in the valve housing 31 at the same level and at angle to bore 54 and communicates with a tubular fitting 57 carried by the valve housing. An elongated flexible tube 58 is connected with fitting 57 and has an aspirator bulb 59 interposed therein, said bulb preferably being provided with a check valve (not shown), whereby it serves as a pump for forcing a gas sample into the burette.

The valve housing 31 is provided with a radial bore 60 at a different level than bores 54 and 56, and in angular relation thereto. A longitudinal bore 61 is formed in the lower end of valve plug 35 in spaced relation to the axis thereof, and a radial bore 62 is formed in said plug at the same level as bore 60 and communicates with the upper end of bore 61.

In the use of the device, the free end of tube 58 is inserted into the space, as a stack, whose gaseous content is to be analyzed; the valve knob is set for registration of bores 53 and 56; and the leveling bottle 27 is positioned at a level below the burette. The aspirator bulb is then operated to pump gas through tube 58 and the valve 30 into the burette 21. When a sample has been taken, the valve knob is rotated to the proper angle to effect registration of the bores 62 and 60, which vents the burette to insure against a gas pressure therein which exceeds atmospheric pressure. The valve knob is then turned to a third position in which the valve is fully closed, and the levelling bottle 27 is raised until the liquid therein and in the burette 21 assume the level, thereby measuring the volume of gas in the burette. The valve is then turned to a fourth position, illustrated in Figs. 2 and 3, establishing registration of bores 53 and 54, and the leveling bottle is raised to force the gas sample into a selected one of the absorbing pipettes 17 for absorption of a selected constituent of the gas sample. All of the valve adjusting movements of the knob thus far described have been in one direction, i. e., clockwise as viewed in Figs. 3 and 4, and the stop head 49 assumes the position illustrated in Fig. 4 relative to set screw 50 whereby further rotation in that direction is prevented. Knob 41 is then turned in the reverse direction to the same position as for the measuring operation, and the leveling bottle is lowered to again bring the liquid therein to the same level as the liquid in the burette, which level determines the percentage of the gas which has been absorbed, i. e., percentage of the constituent of the gas for which the test is being made, when compared to the initial measurement of level with reference to the scale 63 which may be etched upon the burette as shown in Fig. 1 or may be provided upon a separate member 64 juxtaposed to the burette, as illustrated in Fig. 2. Then the knob is turned to a sixth position corresponding to the second position, bringing bores 62 and 60 into register to permit the spent gases to be expelled by again elevating the leveling bottle. Then the knob is returned to the starting position for registration of bores 53 and 56. At this starting position the stop head 49 assumes the position illustrated in dotted lines in Fig. 4 relative to set screw 50, thereby preventing further rotation of the knob in the return direction, i. e., counter-clockwise as viewed in Fig. 4. The operations described above are those required for analysis of a sample for one constituent only, and where more than one constituent is to be determined, additional operations to force the sample into other selected pipettes and to take measurements must be made before the venting or purging operation, as will be apparent.

The accurate positioning of the valve at each of the successive operative stations is facilitated by the arrangement of spring pressed ball 45 and recesses 43. Thus, the operator can turn the knob until he feels the snap seating of the ball in the succeeding recess 43, and he is assured that the valve is in desired adjustment. Also, the ball and recess arrangement prevents accidental displacement of the valve from its required setting during the performance of the step of the analyzing method for which said valve setting has conditioned the apparatus. The combination of the stops 49—50 and of the automatic port-registering snap lock arrangement 43—45 greatly simplifies operation of the device and minimizes the possibilities that error may occur from failure to follow the required sequence of operations or to effect the proper sequence of valve adjustment.

The connection of the valve and burette, and particularly the arrangement of parts at said connection, is of great importance in this device. Thus the clearance between the inner surface of the neck 24 of the burette and the outer surface of the conduit 51 depending from the valve should be of capillary dimension, preferably about .020 of an inch, in order to permit gas to pass around conduit 51 and to restrain liquid, such as water, from passing between said parts under normal operating conditions.

By this arrangement, the liquid in the burette will not pass upwardly and out of the valve at the venting bore 60 in the normal gas-exhausting operation. The termination of the conduit 51 at the level of the 100% mark on the scale is also important, since it permits accurate reading of the results of the analysis up to 100%. Note also that the combined features of capillary passage around conduit 51, termination of said conduit at the 100% mark, and the construction of the plug valve, leave only a small space or volume above and in communication with the burette in which gas can collect or be trapped, and since this gas is present at atmospheric pressure during each analysis, it does not affect the accuracy of the device. In this connection, it will be noted that a small amount of gas may be trapped in passages 52—53 after each cycle has been completed. This does not affect the efficiency or accuracy of the device, because this trapped inert gas is forced into the burette when the next cycle is started, being replaced by fresh gas in the passage during the gas measuring step of the succeeding cycle. Obviously, this is the equivalent of a condition wherein the gas in the burette in the measuring step is all fresh gas, and that in said passages is inert, since the passages communicate with the burette, and as long as the volume of inert gas at atmospheric pressure is known to be equal to the volume or cubic capacity of the passage, the actual location of the inert gas in the communicating spaces during the measuring operation is not important.

The construction illustrated in Fig. 5 is an alternative embodiment of the invention which utilizes a conventional three-way valve 70 which may have three consecutive operative positions as the handle is moved in either direction between the limits of its movement, i. e., a gas transfer position, a venting position and a closed position. Valve 70 has a nipple 71 adapted for connection with the aspirator tube through which a gas sample is supplied to the valve, and has an elongated conduit 72 depending therefrom and extending into the neck 24 at the upper end of burette 21. Conduit 72 has the same capillary clearance, i. e., approximately .020 of an inch, within the neck of the burette, and terminates at the level of the 100% mark on the scale 64 of the burette as in the preferred embodiment. The conduit 72 passes through a chambered fitting 73 having an externally screw threaded neck 74 passing through the top wall of frame 10 and mounting a nut 75 bearing against the upper face of said frame wall. The lower end of fitting 73 has a depending reduced diameter projection 76 connected with burette neck 24 by means of a tube 77 of rubber or like material. Header 55 which leads to the valves controlling the absorbing pipettes is connected with fitting 73 in communication with a bore 78 through the wall of said fitting.

This embodiment possesses the same advantages above outlined with reference to the embodiment shown in Figs. 2 to 4 in all respects except the self-locating and other structural features of the plug type valve. It will also be noted in this embodiment that gas in the passage 72 is never pushed over into the absorbing pipette. The gas which is contained in this passage is trapped therein during the entire operation, so it doesn't enter into the operation of the analyzer at all. The fact that gas is so trapped in passage 72 does necessitate the raising of the liquid level in the device to the full level of valve 70, and to be certain of accurate results, it may be advisable to discharge a small amount of the liquid from the leveling bottle through the outlet 71 in each gas expelling or exhausting step in the use of the apparatus. This will require refilling of the leveling bottle from time to time, but is not an important consideration, especially where the liquid used in said bottle is water.

Another modified embodiment of the invention is shown in Figs. 6 and 7. This embodiment illustrates a horizontally disposed valve whose housing 80 has a tapered bore or chamber 81 whose axis is horizontal. Tapered valve plug 82 is rotatable in said bore and is resiliently urged to seated position by coil spring 83 pressing against and held in place by cap 84 threaded on the front end of the valve housing. A stem 85 projects from the front end of the valve plug and through a central opening in cap 84. A knob 86 is mounted on the outer end of stem 85. A plurality of notches 87 are formed in the periphery of valve plug 82 in circumferentially spaced relation at the small diameter end thereof. A transverse bore in the valve housing mounts a ball 88 at its inner end to seat in notches 87, said ball being pressed inwardly by spring 89 which is retained in place by the set screw 90. A pin 91 projects radially into bore 81 in spaced relation to the small diameter end of valve plug 82 and is engageable by longitudinally extending pin 92 projecting from the end of the valve plug to limit rotation of the valve plug in the housing to less than 360°.

Valve housing 80 has a radial bore 93 communicating with chamber 81 and with an inlet fitting 94. A passage 95 is formed in the valve plug, one end thereof being adapted for registration with bore 93 and the other end thereof being open at the adjacent large diameter end of the valve plug. Another radial bore 96, preferably parallel to bore 93 and longitudinally spaced therefrom, is formed on the same radius of the valve body. Bore 96 communicates with a conduit 97 which leads to the header (not shown) and the absorbing pipettes. In diametrically opposed relation to bores 93 and 96 and at a longitudinal point between said bores, a radial bore 98 is formed in the valve body. The bore is of stepped shape, with the inner small diameter portion thereof mounting the end of a depending tube 99 which projects into the neck of the burette 100 with a capillary clearance, i. e., approximately .020 of an inch, to terminate at the 100% level of the burette scale 101. A sleeve 102 is secured to the valve housing 81 concentric with tube 99 to provide a small clearance therebetween. Sleeve 102 is connected with burette 100 by rubber tube 103. A longitudinal bore 104 communicates with and extends rearwardly from the inner end of sleeve 102 to the rear end of the valve housing, and is plugged at 105. A radial bore 106 intersects bore 104 and is plugged at 107 outwardly of said intersection. The valve plug has a passage 108, one of whose ends is open at the small diameter end of the plug and whose other end is adapted to register with housing bore 106 when passage 95 registers with inlet bore 93. A transverse passage 109 extends diagonally through the valve plug in a radial plane 90° displaced from passages 95 and 108 with its ends adapted to register with bores 93 and 98 at one operative position of the valve plug. Another transverse passage 110 extends diagonally through the valve plug in the same radial plane as passages 95 and 108 with its ends adapted to register with bores 96 and 98 when plug 82 is positioned at an angle 180° displaced from the position shown.

This embodiment of the invention has the same advantages outlined above relative to the Fig. 2 embodiment. Note also that the device is adapted for use with a forced feed gas supply mechanism in place of aspirator bulb 59, since a continuous supply of gas can be vented to atmosphere through passage 95 when the valve plug is at the venting position shown. The same conditions achieving accuracy despite entrapment of small quantities of gas apply to this embodiment as well as to the Fig. 2 and 5 embodiments.

I claim:

1. In a gas analyzer, the combination with a burette, gas pumping means and gas absorbing means, of a valve interposed between and connected with said burette and said pumping and absorbing means, said valve having relatively shiftable parts with selectively registerable ports for controlling the flow of gas in said analyzer, and a tube communicating with one of said ports and projecting into said burette with a capillary clearance whereby the limit to which liquid can rise in said burette is defined by the position of the bottom edge of said tubular valve portion, said valve parts having ports communicating with said capillary clearance and adapted to establish communication between said burette and atmosphere.

2. In a gas analyzer, the combination with a measuring burette, gas supplying means and gas absorbing means, of a fitting interposed between and connected with said burette and said gas supplying and absorbing means, said fitting including a control valve having relatively shiftable ported parts for selectively controlling the flow of gas in said analyzer, and a tube communicating with one of said ports and extending substantially axially into said burette, said tubular portion having a capillary clearance of approximately .020 of an inch in said burette at its terminal portion within said burette, one of said valve ports communicating with said capillary clearance.

3. In a gas analyzer, the combination with a graduated measuring burette, gas supplying means and gas absorbing means, of a fitting interposed between and connected with said burette and said gas supplying and absorbing means, said fitting including a control valve having relatively shiftable ported parts controlling the flow of gas in said analyzer, and a tube communicating with one valve port and extending substantially axially into said burette with a clearance of capillary dimension and terminating at the level of the 100% graduation of said burette, one of said valve ports communicating with said capillary clearance.

4. In a gas analyzer, the combination with a graduated measuring burette, gas supplying means and gas absorbing means, of a ported fitting, means connecting said fitting with said burette and said gas supplying and gas absorbing means, a multi-port valve element shiftable in said fitting, a conduit communicating with one valve port and extending through the means connecting said fitting and burette, said conduit terminating within the upper end of said burette at the 100% graduation thereof and having a clearance therein of capillary size, the other valve port communicating with said capillary clearance between said conduit and said burette, said fitting having a port open to atmosphere with which said last named valve port is adapted to register.

5. In a gas analyzer, the combination with a burette, gas supplying means and gas absorbing means, of a valve housing having a chamber and a plurality of ports therein communicating respectively with said burette and gas supplying and gas absorbing means, a valve element in said chamber having a passage therein, and a conduit communicating with said passage and projecting into said burette with a capillary clearance, said valve element being adjustable for selective communication of its passage with said gas supplying and gas absorbing means, said valve including a selectively operable vent outlet communicating with said burette through the capillary space around said conduit.

6. In a gas analyzer, the combination with a burette, gas supplying means and gas absorbing means, of a valve housing having a chamber therein and ports connecting said chamber with said burette, gas supplying means, gas absorbing means and atmosphere, a valve element in said chamber having a passage therein selectively registerable with said gas supplying and gas absorbing means, and a conduit communicating with said passage and depending from said valve element and projecting within said burette with a capillary clearance, said valve element having a passage communicating with the capillary clearance between said conduit and burette and adapted for registration with the port in said fitting which is open to atmosphere.

7. In a gas analyzer, the combination with a burette, gas supplying means and gas absorbing means, of a plug-type valve having a chambered housing and a rotatable valve element having a plurality of operative positions in said housing and a pair of passages therein, a conduit depending from said valve element in communication with one passage and fitting in the upper portion of said burette with a capillary clearance, said housing having ports communicating with said burette, said gas supplying means, said gas absorbing means and with atmosphere, the passage communicating with said conduit being registerable with said gas supplying and gas absorbing ports, and the other passage being registerable with said atmospheric port and communicating with the capillary space in said burette around said conduit.

8. In a gas analyzer, the combination with a burette, gas supplying means and gas absorbing means, of a plug-type valve including a chambered housing having a plurality of ports therein and a valve element rotatable in said housing and having a pair of passages therein, means connecting said burette and gas measuring and absorbing means with different ports of said housing, and a conduit communicating with one passage of said valve element and extending through the means connecting said burette and housing to terminate within said burette with a capillary clearance, the other passage communicating with said capillary clearance between said conduit and burette and being adapted for registration with a housing port open to atmosphere.

9. In a gas analyzer, the combination with a burette, gas supplying means and gas absorbing means, of a chambered valve housing having a plurality of angularly displaced ports, means connecting said ports with said burette and gas supplying and absorbing means, a valve element rotatable in said chamber and having a pair of passages therein each selectively registerable with certain of said ports, and a conduit communicating with one passage and projecting therefrom through one of said connecting means and into said burette, said conduit having a capillary clearance in said burette, the other passage communicating with the burette through said capillary clearance space in said last named connecting means.

10. In a gas analyzer, the combination with a burette, gas supplying means and gas absorbing means, of a chambered valve housing having a plurality of angularly displaced ports, means connecting said burette and gas supplying and absorbing means with said ports, a valve element rotatable in said chamber and having a pair of passages therein each adapted for selective registration with certain of said ports, spring pressed cooperating means on said housing and element for releasably locking said parts when a passage registers with a port, and a conduit connected with one passage and projecting into said burette with a capillary clearance, the other passage communicating with said burette through the clearance around said conduit.

11. In a gas analyzer, the combination with a burette, gas supplying means and gas absorbing means, of a chambered valve housing having a plurality of relatively angularly disposed ports connected respectively with said burette and gas supplying and absorbing means, a valve element rotatable in said chamber and having a pair of passages therein each selectively registerable with certain of said ports, a conduit carried by said valve element in communication with one passage and extending into said burette with a capillary clearance, the other passage communicating with said burette through the clearance around said conduit, said valve element being rotatable step by step from a starting position through a predetermined angle and then reversely to starting position successively register said passages and ports during a complete cycle of operation of said analyzer, and interengageable stop members on said valve housing and valve element to limit rotation of said valve element in each direction to the limits required in said cycle of operation.

12. In a gas analyzer, the combination with a burette, gas supplying means and gas absorbing means, of a chambered valve housing having a plurality of ports arranged on different radii and at spaced points lengthwise of said housing, means connecting said ports with said burette, gas supplying means and gas absorbing means, and a valve element rotatable in said housing and having a plurality of passages therein adapted to establish communication between said ports and to open selected ports to atmosphere at different rotative positions thereof, the connecting means to the burette comprising a pair of concentric tubes having a small clearance therebetween and communicating with different passages, the inner tube projecting beyond the outer tube and being adapted to fit in said burette with a capillary clearance.

GEORGE B. BAILEY.

REFERENCES CITED

The following references are of record in the file of this patent:

UNITED STATES PATENTS

| Number | Name | Date |
| --- | --- | --- |
| 744,132 | Tutwiler | Nov. 17, 1903 |
| 1,448,901 | Moreland | Mar. 20, 1923 |
| 1,474,097 | Krogh et al. | Nov. 13, 1923 |
| 2,026,842 | Matuszak | Jan. 7, 1936 |
| 2,262,703 | Stuckenholt | Nov. 11, 1941 |
| 2,329,459 | Dickey | Sept. 14, 1943 |

OTHER REFERENCES

Shepherd, Bur. of Standards Research Paper No. 266, 1931, pp. 122–124.